Sept. 3, 1968          J. C. BENNETT          3,399,930
COMPOSITE VEHICLE WHEEL AND METHOD OF MAKING THE SAME
Filed Sept. 6, 1966          2 Sheets-Sheet 1
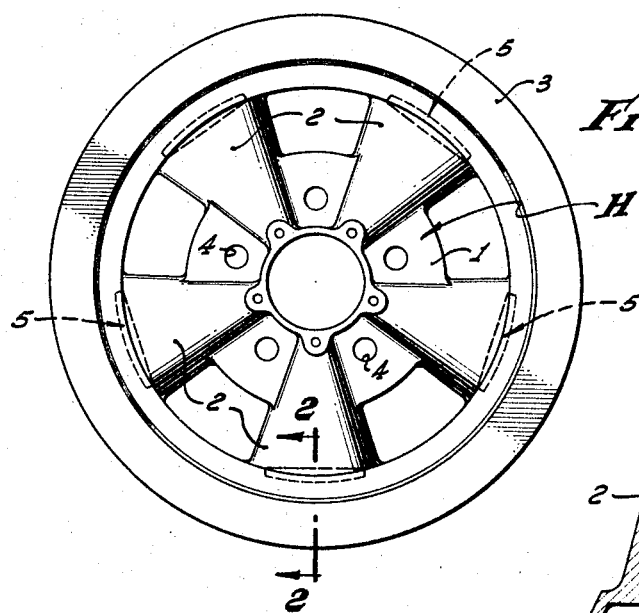
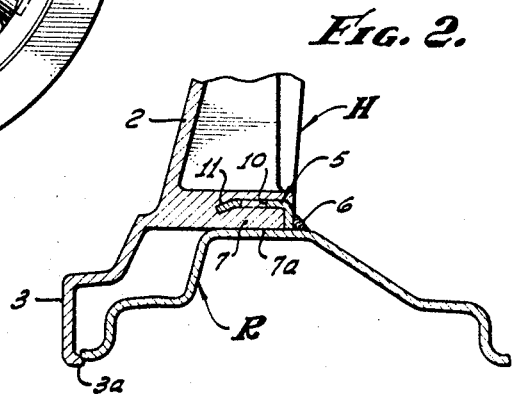
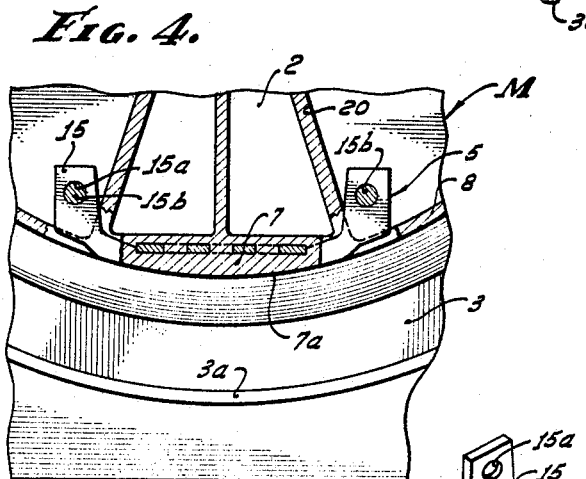
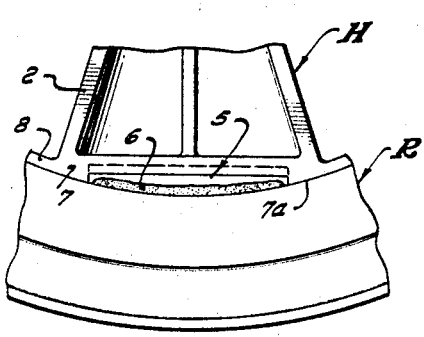
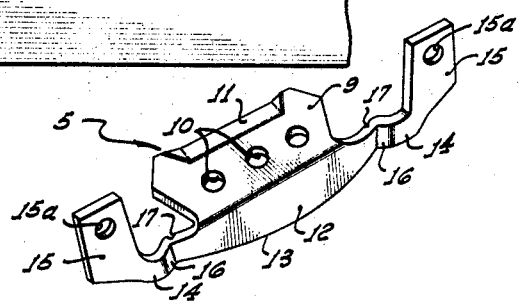
INVENTOR.
JAMES C. BENNETT
BY
Paul A. Weilein
ATTORNEY.

Sept. 3, 1968   J. C. BENNETT   3,399,930
COMPOSITE VEHICLE WHEEL AND METHOD OF MAKING THE SAME
Filed Sept. 6, 1966   2 Sheets-Sheet 2

INVENTOR.
JAMES C. BENNETT
BY Paul A. Weilein
ATTORNEY.

United States Patent Office 3,399,930
Patented Sept. 3, 1968

3,399,930
COMPOSITE VEHICLE WHEEL AND METHOD OF MAKING THE SAME
James C. Bennett, West Covina, Calif., assignor to Electro Chemical Industries, Inc., Pomona, Calif., a corporation of California
Filed Sept. 6, 1966, Ser. No. 577,277
11 Claims. (Cl. 301—65)

ABSTRACT OF THE DISCLOSURE

A vehicle wheel assembly and hub structure in which a hub of metal such as aluminum is constructed with radial spokes carrying metal insert elements on one side and an integrally formed outwardly extended rim simulating flange section which extends substantially to the outer periphery of the tire mounting rim. Each of the insert elements includes an elongate plate with a flange at one edge, the plate being embedded as by casting in a spoke end so that the flange is countersunk therein and extends radially outwardly with the outer edge of the flange being arcuate and engaging the inner periphery of the rim, and with a side surface extending outwardly to the rim and connected by a bead weld to the rim. The plate has openings for interlockingly receiving material of the hub during casting and at the opposite edge is provided with a rectilinear reinforcing and stiffening depressed section which is also embedded. At its opposite ends, the flange has a circumferentially extending frangible portion formed to provide a removable ear extending towards the wheel axis and outwardly offset from the plane of the flange, for initally positioning the insert element during the casting operation, but being removable prior to affixing the tire mounted rim to the flange.

---

The present invention relates to vehicle wheels and more particularly to a composite vehicle wheel comprising a light metal center or hub section and a steel rim welded to a hub section at circumferentially spaced locations and to the method of making the same.

The present invention is an improvement in vehicle wheels as disclosed in the pending application filed July 31, 1964, Ser. No. 386,674, now abandoned. In that application there is disclosed a composite vehicle wheel assembly of the type here involved, namely, a composite vehicle wheel in which a wheel center or hub is die cast or molded or non-ferrous light metal such as aluminum, the center having integrated therewith at circumferentially spaced locations a plurality of ferrous inserts, these inserts having a portion embedded in the light metal wheel center during the casting or molding process and having another portion exposed at the inside face of the wheel center adjacent circumferentially extended rim engaging surfaces at circumferentially spaced spoke locations about the wheel center, and the center fitting within the inner periphery of a steel tire mounting wheel rim, the inserts in the wheel center and the steel rim being unitized by beads of weld.

Such wheels constitute a significant improvement in the art of composite lightweight wheel assemblies as compared with prior wheels of the general class here involved wherein the steel rim is secured to the lightweight hub or wheel center by applied fastening elements such as rivets or bolts, which applied fastening elements afford an opportunity for loosening, resultant loss of air from the wheel in the event that typical tubeless tires are employed thereon, and ultimate failure of the fasteners due to relative working of the center and rim elements.

The present invention as a primary object contemplates the provision of a wheel construction of the type wherein an insert is welded to the rim as in the case of the wheel of the above identified pending application, but wherein the center and the steel inserts carried thereby are so constructed that the center is provided with an outwardly extended rim simulating flange section which extends substantially to the outer periphery of the tire mounting rim thereby aesthetically enhancing the general appearance of the wheel since it simulates a wheel consisting of a single unit.

In the manufacture of wheels of the type employing steel inserts embedded in a light metal center and welded to the steel rim, it is the practice to dispose the inserts in outer marginal regions of a mold, the inserts having portions projecting from the mold and held fixed, thus serving to fix the relative location of the inserts in respect to the axis of the wheel center, whereby a well balanced and rigid wheel assembly is the ultimate result. In the above identified pending application the inserts are disclosed as having portions which serve to initially support the inserts in the mold and which project radially outward from the mold. In accordance with the present invention however, it is desired to have as a part of the casting of the wheel center a radially outwardly extended flange-like member as referred to above. Therefore, it is impractical to employ inserts of the form shown in the above identified application since the radial outward projection of both the inserts and the flange-like section of the center beyond the outer perimeter of the wheel center creates a practical problem in the removal of the cast wheel center from the mold.

Thus, another object of the invention is to provide a cast or molded wheel center having inserts embedded therein wherein the inserts have radially extended portions lying on a plane with the inner face of the wheel center, the wheel center having spokes the outer portions of which constitute the periphery of the wheel center and these spokes having on the front face of the wheel center a radially outwardly projecting flange adapted to extend substantially to the outer perimeter of the wheel rim following assembly of the rim and the wheel center, and the inserts having in addition to a circumferentially extended surface formed on a radius the same as the radius of the inner periphery of the rim, circumferentially extended and radially inwardly projecting supporting ear portions which are adapted to initially support the inserts during casting or molding of the wheel center, these ear portions being disposed between the spokes of the wheel center to afford connection of the ear portions to supporting pins and said ear portions further being removable from the insert proper prior to assembly of the center with the rim. In accordance with the illustrative embodiment of the invention, the ear portions are frangibly removable from the insert proper.

The present invention has as a further object the provision of an improved method for making composite vehicle wheels of the type referred to above, this method involving locating steel elements in a plurality of circumferentially spaced locations at the outer margin of a mold, said mold having a margin or wall extended circumferentially to form circumferentially extended rim mounting portions of the wheel center and also having generally radial walls extended inwardly from the circumferentially extended wall and in angularly spaced relation to form spokes radiating inwardly from the circumferentially extended wheel center surfaces, and with portions of the steel elements extending radially inward relative to said margin of the mold in circumferentially spaced relation to said radially extended walls, and said mold also having a wall extending radially outwardly from said circumferentially extended wall and adapted to form a radially outwardly extended flange on the wheel center, and after filling the mold with molten light metal and allowing the molten metal to harden to form the wheel center and unite the steel elements with the wheel center, removing from the steel elements said radially inwardly extended portions, then placing the center within the inner periphery of the steel rim and welding an exposed radial face of said steel elements to the circumferentially extended inner periphery of the rim.

Preferably, when the center is finished prior to insertion into the rim, the diametrical distance across the circumferentially spaced rim mounting portions of the center should be sufficiently large as to require that the center be pressed forcibly into the rim, thereby placing the center under a compressive preload.

Other objects and advantages of the invention will be hereinafter described or will become apparent to those skilled in the art, and the novel features of the invention will be defined in the appended claims.

In the accompanying drawings:

FIG. 1 is a side elevation of the outboard or outer side of a lightweight wheel construction made in accordance with the invention;

FIG. 2 is a fragmentary radial sectional view as taken on the line 2—2 of FIG. 1 and on a somewhat enlarged scale;

FIG. 3 is a fragmentary side elevational view of the inboard or inner side of the wheel rim and hub assembly on a somewhat enlarged scale;

FIG. 4 is a fragmentary detail view partly in plan showing a portion of one of the complemental parts of a mold with the wheel center formed therein, a portion of the spoke of the wheel center being broken away and shown in section, and the frangible ears being shown prior to removal from the steel insert and located on pins supported by the mold;

FIG. 5 is a detail view in perspective illustrating one of the steel inserts adapted to be employed in the method hereof in the manufacture of the composite wheel;

Like reference characters in the several views of the drawings and in the following description designate corresponding parts.

Figure 6:
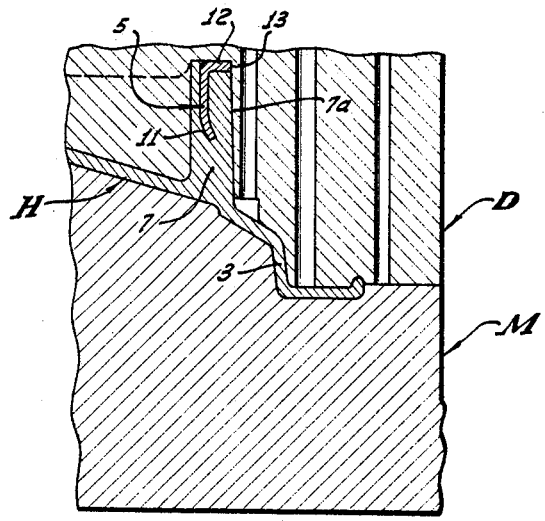
FIG. 6 is a fragmentary vertical sectional view as taken on the plane of the line 6—6 of FIG. 4 showing the outer peripheral segment of a wheel center in die casting dies prior to removal therefrom.

Referring first to FIG. 1, there is generally illustrated a wheel assembly comprising a hub or center H which includes a central section 1 having a plurality of radiating spokes 2 and providing between said spokes wheel mounting webs. Circumferentially extended about the spokes 2 is a flange section 3 which is integral with the spokes 2 and which aesthetically simulates a wheel rim on which the usual tire would be mounted. In order to mount the wheel upon the axle or more particularly upon the usual brake housing, the central section 1 of the hub is provided with a series of circumferentially spaced openings 4 in the webs formed by the central section 1 for the reception of the usual lug bolts.

Referring to FIG. 2 it will be noted that the flange 3 extends radially outward as well as axially relative to the spoke 2 and has an edge flange turned inwardly as at 3a adjacent the margin of a wheel rim R, this rim R being the usual wheel rim on which the tire is to be mounted.

In accordance with the present invention, the rim R is composed of steel, while the hub H is composed of a light non-ferrous metal such as aluminum. Thus, there is generally denoted at 5 a ferrous or steel insert integrated with or embedded in each spoke and joined to the rim R by a bead of weld designated 6. Each spoke 2 provides a circumferentially extended rim mounting portion 7 which conforms to the curvature of the inner periphery of the rim R and if desired a web 8 may extend circumferentially between the spokes for purposes of rigidity.

Referring for the moment to FIG. 5 the insert 5 will be seen to comprise a plate-like section 9 having a plurality of openings 10 and a nonplanar configuration including a depressed section 11 whereby the plate 9 during molding or casting of the hub H is adapted to be rigidly integrated with the respective spokes 2. Projecting from the plate 9 is a flange 12 having an arcuate outer surface 13. The flange 12 is adapted to have its outer surface so disposed relative to the inner periphery of the rim R as to enable formation of the bead weld 6. In the illustrative embodiment the flange 12 is flush with the inside face of the arcuate wheel mounting portion 7 of the respective spokes 2. In this manner the flange 6 is wholly supported by the wheel mounting portion 7 against flexure. The arcuate outer edge 13 of the flange 12 is adapted to substantially conform to the inner periphery of the rim R thereby providing a surface defining with the inner periphery of the rim R a region at which the weld 6 may be formed.

During the manufacture of a wheel as described above and more particularly during the molding or casting of the wheel hub or center H it is necessary that the inserts 5 be positively fixed in relation to the mold surfaces which will form the generally radial sides of the spokes 2 as well as the circumferentially extended outer surface of the rim mounting portions 7 of the center H. In accordance with the present invention, fixation of the inserts is accomplished by means of circumferentially projecting portions 14 at opposite ends of the insert 5 having ears 15 projecting therefrom generally in a direction towards the axis of the wheel center H. The projecting portions 14 have an angular outwardly projecting section 16 so that the ears 15 will be disposed on a plane slightly spaced from the plane of the flange 12.

The projecting portions 14, moreover, are removable from the flange 12 and in the illustrative embodiment there is shown at 17 a reduced or weakened frangible section at which the projecting portions 14 are frangibly removable from the insert 5. The span between the weakened sections 16 is approximately equal to the distance between the radial edges of the spokes 2. At least in this connection the ears 15 should project past the respective opposite radial edges of a spoke so that openings 15a in the respective ears 15 may be engaged by a suitable pin so as to positively fix the disposition of the steel insert 5 relative to the respective spokes 2 as the wheel center H is being molded or cast.

Figure 7:
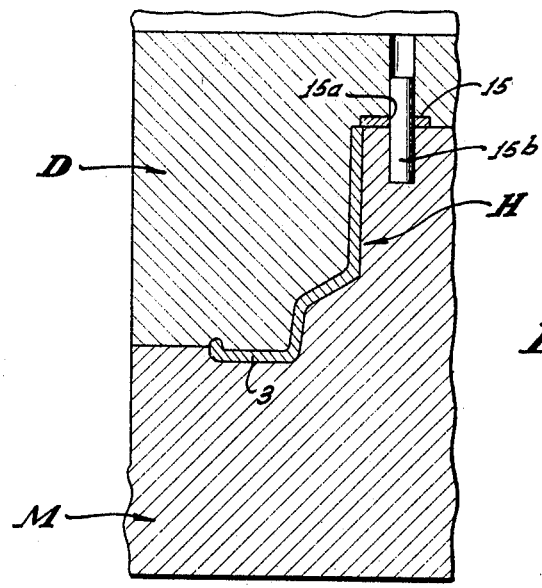
FIG. 7 is a fragmentary view in section as taken on the plane of the line 7—7 through the insert supporting pins of the dies of FIG. 6.

In accordance with the method of the present invention, there is shown in FIG. 4 a fragmentary section of a mold generally denoted at M which, as will be understood, contains a cavity corresponding in form and contour to the outside face of the wheel as viewed in FIG. 1. Thus, the mold cavity would include radial walls one of which is designated 20 in FIG. 4 which will define the outer contour of the spoke 2. The circumferentially extending rim mounting portion 7 of spoke 2 and more particularly the arcuate surface 7a shown in FIG. 4 as well as the inside configuration of the flange section 3 and the inside configuration of the spoke 2 will all be defined by a companion molding member D, as shown in FIGS. 6 and 7, cooperative with the mold M, such companion member D being, for example, in the form of a die disposable within the cavity of the mold M so as to provide the completed mold for enabling the casting of the wheel center H.

Between the mold M and the companion jig or mold member D the ears 15 of the insert 5 are adapted to be positioned in fixed relation to the mold surfaces which will define the arcuate rim mounting surface 7a just referred to and the radially extended spoke forming surface 20. Pins 15b are illustrated in FIGS. 4 and 7 as being extended through the openings 15a in the ears 15. These pins and the ears are disposed in circumferentially spaced relation to the radial walls 20 of the mold M and the pins 15b may be carried either by the mold M, as shown in FIG. 7, or the companion die or mold member D. In any event, in view of the disposition of the ears 15, the cast wheel center H is free for removal from the cavity of mold M following removal from the hardened wheel center H of the complemental die or mold element D. Moreover, upon removal of the cast wheel center H from the mold M, the ears 15 will be disposed in the angularly spaced openings in the wheel center lying between the spokes 2 whereby the ears may be subjected to a force to cause fracture of the projecting portions 14 at the reduced section 17.

From the foregoing, it will now be apparent that the present invention provides a wheel assembly which has the desirable aesthetic quality of simulating a unitary wheel since the flange section 3 of the wheel center H conceals the rim R. In addition, the present invention provides a novel structure of the insert 5 facilitating the manufacture of the wheel of the present invention in accordance with the method hereof.

While specific structural details have been shown and described, it should be understood that changes and alterations may be resorted to without departing from the spirit of the invention as defined in the appended claims.

I claim:

1. A light metal center for a vehicle wheel adapted to be assembled with a rim, said wheel center comprising: a central section and a plurality of spokes extending radially from said central section; said spokes having arcuate outer ends adapted to engage with the inner surface of the rim upon assembly therewith; ferrous metal inserts embedded in the ends of said spokes and having a surface exposed at the inner side of said wheel center adjacent the outer ends of said spokes; said inserts also having portions projecting radially inward from said outer ends of said spokes and providing means for fixing said inserts in position during the molding of said center.

2. A wheel center as defined in claim 1, wherein said spokes are provided with an integral circumferentially extended and outwardly projecting wheel rim simulating flange.

3. A light metal wheel center as defined in claim 1, wherein said portions of said inserts extend circumferentially from said surface past opposite radial surfaces of said spokes; and including means removably connecting said projecting portions to said insert.

4. A wheel center as defined in claim 3, wherein said portions of said insert include a section extending at an angle to the inside of said wheel center and supporting said portions on a plane spaced from the plane of the inside of said wheel center.

5. An insert for use in connecting a light metal wheel center to a steel rim, said insert being composed of ferrous metal and comprising: a plate; a flange projecting at an angle to said plate and having an arcuate outer edge adapted to substantially conform to an inner periphery of the steel rim; portions projecting laterally arcuately outwardly from opposite ends of said flange; ears on said outwardly projecting portions extending in a direction generally opposite to said outer edge; said ears having means for fixing the relationship of said insert in a mold; and means removably connecting said outwardly projecting portions to said flange.

6. An insert for use in connecting a light metal wheel center to a steel rim as defined in claim 5, wherein said means removably connecting said projecting portions to said flange comprise reduced frangible sections in said portions.

7. An insert for use in connecting a light metal wheel center to a steel rim as defined in claim 5, wherein said plate is provided with a nonplanar configuration.

8. The method of making a wheel assembly including a light metal center and a steel rim, comprising: locating in a plurality of circumferentially spaced locations at a margin of a mold having radial spoke defining surfaces a plurality of steel elements with a portion of each steel element adjacent said margin and other portions of said steel element extending inwardly from said margin on opposite sides of said radial spoke forming surfaces; engaging the inwardly projecting portions of said steel inserts to fix the relationship of said inserts to said radial mold surfaces and said margin; filling said mold with molten light metal; allowing said molten light metal to harden to form said wheel center and to unite said steel elements therewith; removing from sail steel elements said inwardly projecting portions; placing said hub within the inner periphery of a steel rim; and welding said surface of said elements to said rim.

9. The method of making a wheel assembly including a light metal center and a steel rim, comprising: locating in a plurality of circumferentially spaced locations at a margin of a mold having radial spokes defining surfaces a plurality of steel elements with a portion of each steel element adjacent said margin and other portions of said steel element extending inwardly from said margin; engaging the inwardly projecting portions of said steel inserts to fix the relationship of said inserts to said radial mold surfaces and said margin; filling said mold with molten light metal; allowing said molten light metal to harden to form said wheel center and to unite said steel elements therewith; removing from said steel elements stil inwardly projecting portions; placing said hub within the inner periphery of a steel rim; and welding said surface of said elements to said rim.

10. The method of claim 9, wherein said hub is pressed within the inner periphery of said steel rim and the hub is under compression within said rim.

11. The method of making a light metal wheel center, comprising: locating in a plurality of circumferentially spaced locations at a margin of a mold having radial spoke defining surfces a plurality of steel elements with a portion of each steel elment adjacent said margin and other portions of said steel element extending inwardly from said margin on opposite sides of said radial spoke forming surfaces; engaging the inwardly projecting portions of said steel inserts to fix the relationship of said inserts to said radial mold surfaces and said margin; filling said mold with molten light metal; allowing said molten light metal to harden to form said wheel center and to unite said steel elements therewith; removing from said steel elements said inwardly projecting portions.

References Cited

UNITED STATES PATENTS

| 2,164,883 | 7/1939 | Moore | 301—6 |
| 2,315,523 | 4/1943 | Hubbell | 339—113 |
| 2,653,547 | 9/1953 | Langdon | 301—65 |
| 3,250,571 | 5/1966 | Richter | 301—65 |
| 3,250,572 | 5/1966 | Walker | 301—65 |
| 3,302,273 | 2/1967 | Benton et al. | 301—65 X |
| 3,346,301 | 10/1967 | Hurst | 301—70 X |

FOREIGN PATENTS

| 387,086 | 2/1933 | Great Britain. |
| 791,141 | 2/1958 | Great Britain. |

RICHARD J. JOHNSON, *Primary Examiner.*